United States Patent [19]
Kuchler

[11] 3,834,475
[45] Sept. 10, 1974

[54] WEIGHING SYSTEM

[75] Inventor: Fritz Kuchler, Klagenfurt, Austria

[73] Assignee: Brain Dust Patents Establishment, Vaduz, Liechtenstein

[22] Filed: Mar. 26, 1973

[21] Appl. No.: 345,075

[30] Foreign Application Priority Data
Mar. 24, 1972 Austria .............................. 2575/72

[52] U.S. Cl. ................................................ 177/25
[51] Int. Cl. ............................................. G01g 23/22
[58] Field of Search ........ 177/25; 235/58 PS, 61 PS, 235/92 WT

[56] References Cited
UNITED STATES PATENTS
| | | | |
|---|---|---|---|
| 2,963,222 | 12/1960 | Allen | 235/61 PS |
| 3,393,302 | 7/1968 | Cichanowicz et al. | 177/25 X |
| 3,741,324 | 6/1973 | Boshinski et al. | 177/25 X |

Primary Examiner—George H. Miller, Jr.
Attorney, Agent, or Firm—Ernest G. Montague; Karl F. Ross; Herbert Dubno

[57] ABSTRACT

An input couples a weighing scale having an individual price indicator and producing a binary signal corresponding to the price of a transaction to inputs of a first counter for selectively supplying signals corresponding to the price of a transaction from the weighing scale to the first counter. The first counter thus provides a count corresponding to the price of each weighing transaction An output couples the outputs of the first counter to the input of a second counter and simultaneously erases the count of the first counter. The second counter thus provides a count corresponding to the total price of a plurality of weighing transactions.

6 Claims, 1 Drawing Figure

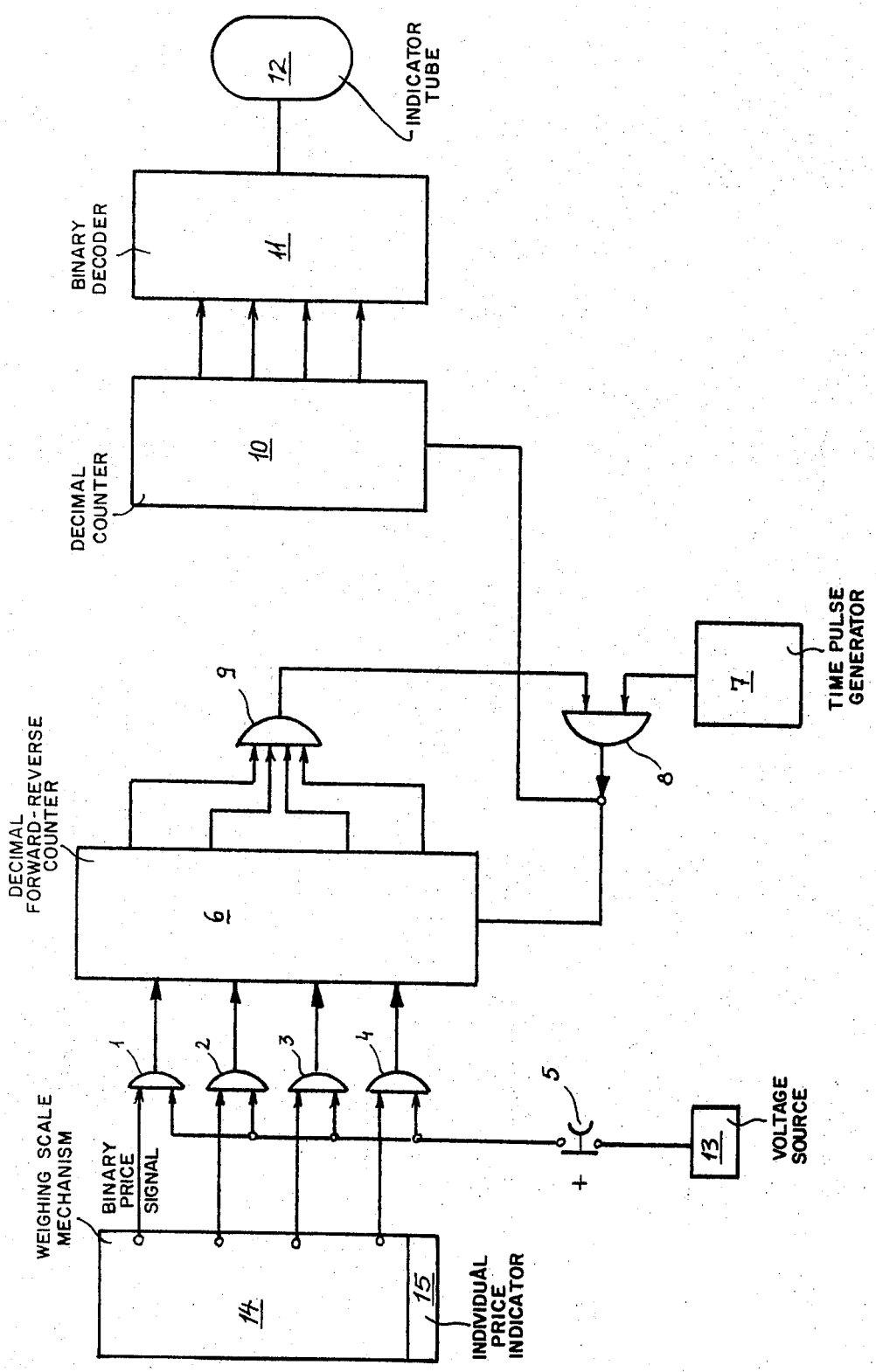

WEIGHING SYSTEM

DESCRIPTION OF THE INVENTION

The present invention relates to a weighing system.

Scales are known, for example, for grocery counters, which indicate not only the weight of goods being weighed but which indicate at the same time the selling price. For this purpose the fixed price per pound is typed into a keyboard. A calculating device issues the corresponding individual price. Besides the indication by means of numerical scales moving in front of a magnifying glass, the more modern digital indication by means of indicating tubes has proved successful.

It is furthermore known to equip calculating scales in such a way that not only the individual price is indicated, but that the different items of a purchase are added and the end result is issued. This is, however, exclusively done by means of vouchers.

An object of the invention is to provide a weighing system for assisting the customer in surveying his purchase and which not only indicates the individual prices, but which also indicates interim sums after each added item.

In accordance with the invention, the foregoing result is achieved by an adding device connected to the individual price indicator of the weighing scale means. A separate indicator is connected to the adding device. A key is provided for actuating the adding device and the interim sum is indicated after each addition. In this manner, existing scales not equipped with an adding device may easily be converted, since the device is connected to the already existing individual price indicator. This system is also extremely advantageous in new constructions since, as hereinbefore described, after each item the interim sum is visible for both the seller and customer. The idea could be compared with the delivery of liquid fuel of fuel pumps. In such case, the delivered quantity in gallons as well as the amount presently to be paid are indicated. This enables continuous control of the price.

In one embodiment of the invention, the adding device comprises a decimal forward-reverse counter electrically connected to the output of the individual price indicator via an AND gate. The counter absorbs the content of the individual price when the key is operated or depressed. The count or content of the counter is set to zero by a time pulse generator via an AND gate. The time pulse generator is connected to a decimal counter which stores the number of time pulses and thereby acquires the content of the forward-reverse counter. A binary decoder connects the output of the decimal counter to an indicator device for the interim sums, or the result of each weighing transaction, and end sums, or the total result of a plurality of weighing transactions. The values indicated by the indicator tubes are stored by the decimal counter in the form of a count or reading. The reading of the decimal counter may be cancelled by pulse.

Furthermore, in order to give the purchaser the chance to decide whether or not to buy a particular item in view of its price and weight, the individual price together with weight and price per pound is indicated first. If the item is purchased the operator will press a key which actuates the addition device.

In order that the invention may be readily carried into effect, it will now be described with reference to the accompanying drawing, wherein the single FIGURE is a block diagram of an embodiment of the weighing system of the invention.

The corresponding individual price signal is provided in binary form at one input of each of the AND gates 1, 2, 3 and 4. The second input of each of the AND gates is connected in common with those of the others to a source of voltage 13 via a key 5, so that the AND gates provide a connection to the decimal forward-reverse counter 6.

The weighing scale mechanism 14, which includes an individual price indicator 15 showing the individual price corresponding to the weight or the price of each weighing transaction, is coupled to the counter 6 via the AND gates 1, 2, 3 and 4. The weighing scale mechanism and indicator may comprise any suitable known type of scale mechanism and indicator. The counter 6 may comprise any suitable type of forward-reverse decimal counter.

The counter reading may be erased by reverse or backward counting. A time pulse generator 7 is provided for this purpose. The pulse generator 7 is connected to the counter via an AND gate 8 which erases the counter reading by reverse counting.

The AND gate 9 has a plurality of inputs connected to the outputs of the counter 6 and an output which supplies voltage to one input of the AND gate 8 until the reading of the counter is zero. The other input of the AND gate 8 is connected to the pulse generator 7 and its output is connected to an input of the counter 6. The number of erasing pulses thus corresponds to the reading of the counter 6. These pulses are fed from the output of the AND gate 8 to a decimal counter 10. The decimal counter 10 may comprise any suitable type of decimal counter and adds the individual pulses of each individual price indication or weighing operation when the key 5 is depressed. Since the count of the counter 10 is still present in binary form, a binary decoder 11 of any suitable type is provided and connected between said counter and an indicator tube 12. The indicator tube 12 may comprise any suitable indicating tube such as, for example, a Nixie tube. The tube 12, which in the illustration of the invention represents only one decimal of an indicating field, thus provides sub-totals, as well as the final grand total.

In order that in the event of an incorrectly supplied value the complete calculating operation need not be repeated, it is possible to subtract the individual price which has been entered or which is to be entered again. If an amount which has already been entered is to be erased, this may be accomplished by depressing an erase key (not shown in the FIGURE) without interruption of the addition.

When the key is depressed, the counter 6 is shifted to forward counting. If, for example, the number "6," which is present as an input signal in the counter 6, is to be erased, the counter counts forward up to the next decimal place 6, 7, 8, 9, 10; 10 being equal to zero. Accordingly, four pulses from the pulse generator 7 are required to bring the counter 6 to zero. The four pulses are supplied to the counter 10. The counter 10 has a count of "8," for example, from the preceding addition of 2 + 6. The number "6" is then erased in a manner whereby the arriving four pulses are added to the count or content "8" of the counter 10. This results in a count of "12" or, since this analysis is an example for only one place, "2." This, however, is the desired result, reduced by the erroneous entry.

To insure that the individual price will not be added several times, each addition is recorded by an item indication. A new addition command by depressing the key 5 can only be affected if the weighing mechanism has been changed or the individual price has been modified.

I claim:

1. A weighing system including weighing scale means having an individual price indicator, the scale means producing a binary signal corresponding to the price of a transaction, said weighing system comprising first counter means having inputs and outputs;

input means coupling the weighing scale means to the inputs of the first counter means for selectively supplying binary signals corresponding to the price of a transaction from the weighing scale means to the first counter means whereby the first counter means provides a count corresponding to the price of each weighing transaction;

second counter means having an input and output; and output means coupling the outputs of the first counter means to the input of the second counter means and simultaneously erasing the count of the first counter means whereby the second counter means provides a count corresponding to the total price of a plurality of weighing transactions.

2. A weighing system as claimed in claim 1, wherein the first counter means comprises a forward-reverse decimal counter and the second counter means comprises indicating means, a decimal counter connected to the output means and a binary decoder coupling the decimal counter to the indicating means whereby the indicating means indicates the total price of all the weighing transactions.

3. A weighing system as claimed in claim 1, wherein the input means comprises a key and electronic switching means connected between the weighing scale means and the first counter means and controlled by the operation of the key for supplying the binary signals corresponding to the price from the weighing scale means to the first counter means.

4. A weighing system as claimed in claim 3, wherein the output means comprises first electronic switching means connected to the outputs of the first counter means and second electronic switching means connected to and controlled in operation by the first electronic switching means and connecting the first electronic switching means to the first counter means and to the second counter means.

5. A weighing system as claimed in claim 1, wherein the input means comprises a source of voltage, a key and a plurality of AND gates each having first and second inputs and an output, circuit means connecting the first inputs of the AND gates to the weighing scale means, circuit means connecting the outputs of the AND gates to the inputs of the first counter means and circuit means connecting the second inputs of the AND gates in common to the source of voltage via the key whereby when the key is operated voltage is applied to the second inputs of the AND gates and the binary signals corresponding to the price are supplied from the weighing scale means to the first counter means.

6. A weighing system as claimed in claim 5, wherein the output means comprises a first AND gate having a plurality of inputs connected to the outputs of the first counter means and an output, a second AND gate having first and second inputs and an output, a pulse generator connected to the first input of the second AND gate, circuit means connecting the output of the first AND gate to the second input of the second AND gate and circuit means connecting the output of the second AND gate to the first counter means and to the input of the second counter means whereby output signals of the first counter means switch the second AND gate to conductive condition whereby the second AND gate conducts a signal to the first counter means to provide a reverse count and to the second counter means to provide a count.

* * * * *